US006980618B1

(12) United States Patent
Chou et al.

(10) Patent No.: US 6,980,618 B1
(45) Date of Patent: Dec. 27, 2005

(54) PHASE OFFSET DETECTION

(75) Inventors: Shaohan J Chou, Marlboro, NJ (US);
Jianqiang Xin, Lincroft, NJ (US);
Jinguo Yu, Manalapan, NJ (US)

(73) Assignee: Agere Systems Inc., Allentown, PA (US)

( * ) Notice: Subject to any disclaimer, the term of this patent is extended or adjusted under 35 U.S.C. 154(b) by 635 days.

(21) Appl. No.: 09/636,455

(22) Filed: Aug. 11, 2000

(51) Int. Cl.[7] ............................. H04B 1/38; H04L 5/16
(52) U.S. Cl. ..................... 375/371; 375/222; 375/226
(58) Field of Search ........................ 370/503; 375/222, 375/226, 254, 265, 371; 714/189, 792

(56) References Cited

U.S. PATENT DOCUMENTS 5,199,046 A * 3/1993 Ling .......................... 375/222
5,444,710 A * 8/1995 Fisher et al. ................ 370/442
6,072,810 A * 6/2000 Van der Putten et al. ... 370/503
6,456,651 B1 * 9/2002 Pilozzi et al. ............... 375/222
6,594,242 B1 * 7/2003 Kransmo .................... 370/331

FOREIGN PATENT DOCUMENTS

WO      WO 01/58173 A2 *  8/2001

* cited by examiner

*Primary Examiner*—Amanda T. Le
*Assistant Examiner*—Lawrence Williams

(57) ABSTRACT

A system that detects and corrects for phase offset between a subscriber and a service provider. The phase offset detection and correction system provides for improved performance of Pulse Code Modulation encoding in the upstream direction.

11 Claims, 3 Drawing Sheets

PHASE OFFSET DETECTION

FIELD OF THE INVENTION

This invention relates to apparatus and methods for compensating for phase offset errors between a service provider and a subscriber. Particularly, the invention concerns apparatus and methods for correcting for phase offset errors between an analog modem and a digital network.

BACKGROUND OF THE INVENTION

FIG. 4 shows the basic elements of an end-to-end transmission within the Public Switched Telephone Network (hereinafter "PSTN"). The PSTN shown includes first and second Subscribers, first and second Service Providers, and a Switched Digital Network. Analog Subscriber Loops connect the Subscribers to their respective Service Providers, and the Switched Digital Network connects the Service Providers together. The term "Subscriber" refers to any device that transmits information signals over the analog subscriber loop, such as a telephone, voice band modem, ISDN line, Discrete Multi-tone System (e.g. digital subscriber line), or a computer equipped with one of these devices. The term "Service Provider" refers to a device connected between the analog subscriber loop and the Digital Network. Typical Service Providers include Central Offices and Internet Service Providers.

The Analog Subscriber Loops are conventional twisted pairs that transport analog signals from the Subscriber Equipment to the associated local Service Provider. At the Service Provider, the analog signals are converted to 64 kbps DS0 digital data streams by a channel unit filter and codec, which together implement a bandlimiting filter followed by subsequent analog to digital conversion using a nonlinear encoding rule. The resulting DS0 streams are transported to their respective destination Service Provider via the Switched Digital Network.

At the Service Provider 1, Subscriber's 1 loop signal is first bandlimited. The bandlimited analog signal is then sampled at a rate of 8 ksamples/second, and then converted into an 8-bit digital representation using a nonlinear mapping rule referred to as Pulse Code Modulation ("PCM") encoding. This encoding is approximately logarithmic, and its purpose is to permit relatively large dynamic range voice signals to be represented with only 8 bits per sample. Exemplary PCM encoding schemes include A-law and mu-law encoding; See S. Haykin, "Communication Systems", John Wiley & Sons, 1983, $2^{nd}$ edition, pages 407–438, the contents of which are incorporated herein by reference.

Subscribers 1 and 2 may use a conventional modem to transmit digital data over the configuration of FIG. 4. The conventional modem encodes the subscriber's digital data into a symbol sequence. The symbol sequence is then represented as an appropriately bandlimited analog signal which can be transmitted over the approximately 3.5 kHz bandwidth available on the end-to-end connection. An exemplary modem can include a Digital to Analog converter (i.e. D/A),) an Analog to Digital converter (i.e. A/D), and a hybrid.

To increase the rate of data transmission in the upstream, i.e. from the Subscriber to the Service Provider, it has been suggested that the subscriber transmit using PCM encoding. However, using PCM encoding in the upstream direction faces special problems. In particular, the phase offset between the Subscriber and the Service Provider greatly degrades the performance of PCM encoding in the upstream direction.

Accordingly, there is a need for an apparatus and method that accounts for the phase offset between the Subscriber and the Service Provider.

SUMMARY OF THE INVENTION

In accordance with the invention, transmission in the upstream direction is improved by correcting for a phase offset between a subscriber and a service provider. One aspect of the invention provides for a method of sending a training signal from the subscriber to the service provider; receiving the training signal at the service provider; calculating the phase offset between the subscriber and the service provider based upon the received training signal; transmitting the calculated phase offset from the service provider to the subscriber; and pre-adjusting a new signal transmitted from the subscriber to the service provider based upon the transmitted phase offset. The service provider, under this method, is synchronized to a network clock.

Another aspect of the invention provides for a subscriber including a digital to analog converter, an analog to digital converter, a clock recovery circuit, and a control element. The digital to analog converter converts a digital signal into an analog signal in preparation for transmission over the analog subscriber loop, while the analog to digital converter converts analog signals received from the analog subscriber loop into a received digital signal. The clock recovery circuit recovers a clock signal from the received digital signal. The subscriber also includes a control element that generates a phase adjusted clock signal by adjusting the phase of the recovered clock signal by a phase offset. The phase offset is based upon the arctangent of a training signal that was modulated by the service provider. The subscriber can correct for the phase offset by synchronizing subsequent conversions by the digital to analog converter with the phase adjusted clock signal. This synchronization to the phase adjusted clock signal causes signals transmitted by the subscriber to be in phase with the network clock when received at the service provider.

In a further aspect of the invention, a service provider determines a phase offset between the service provider and a subscriber operably coupled to the service provider. The service provider that determines the phase offset includes a cosine modulator, a sine modulator, and a processor. The cosine modulator modulates a training signal received from the subscriber by a cosine function to generate a signal Rx, and the sine modulator modulates the training signal received from the subscriber by a sine function to generate a signal Ry. The processor then determines the phase offset based upon the arctangent of (Rx/Ry).

BRIEF DESCRIPTION OF THE DRAWINGS

The features and advantages of the invention will be apparent from the following description, as illustrated in the accompanying Figures in which like reference characters refer to the same elements throughout the different views.

DETAILED DESCRIPTION

Figure 1:
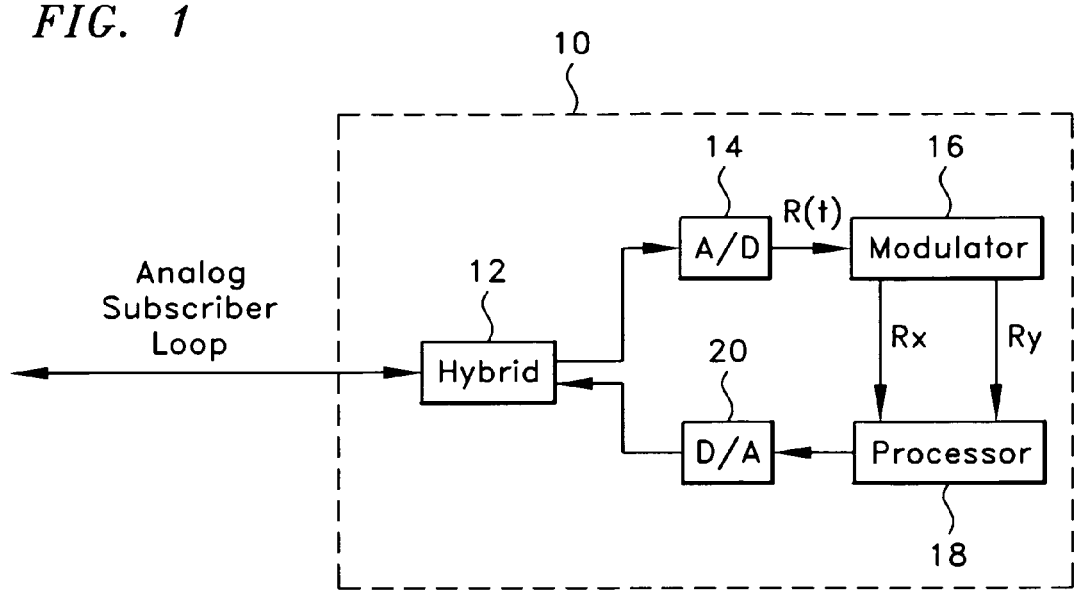
FIG. 1 is a block diagram of a service provider, in accordance with the invention.

FIG. 1 is a block diagram of a service provider 10, in accordance with the invention. The service provider 10 determines a phase offset between the service provider 10 and a subscriber 20 of FIG. 2 operably coupled to the service provider. The service provider includes a modulator 16 and a processor 18. The modulator 16 includes a cosine modulator for modulating a training signal received from the subscriber by a cosine function to generate a signal Rx. The modulator 16 also includes a sine modulator for modulating a training signal received from the subscriber by a sine function to generate a signal Ry. The processor 18 receives signals Rx and Ry as input from the modulator 18. The processor then determines the phase offset based upon a computation of the arctangent of (Rx/Ry).

The modulator 16 and the processor 18 can be implemented using a data processor, such as a digital signal processor or a microcontroller executing software instructions. Alternatively, the modulator and the processor can be implemented entirely in software executing on a computer, entirely in electrical circuitry, or in a hybrid of software and electrical circuitry.

The service provider 10 can also include a hybrid 12, and A/D converter 14, and a D/A converter 20. The A/D 14 is operably coupled between the hybrid 12 and the modulator 16, while the D/A 20 is operably coupled between the hybrid 12 and the processor 18. The hybrid 12 operably couples the service provider 10 to the analog subscriber loop.

The hybrid 12 can generally be described as a passive device used for converting a dual analog signal that is carried on one pair of conductors (i.e. the analog local loop) to separate analog signals that are carried on two pairs of conductors. Those skilled in the art are familiar with the use and operation of hybrid devices and, thus, a detailed description thereof is not necessary to enable one of skill in the art to make and practice the present invention The D/A 20 converts digital signals to analog signals for transmission over the analog local loop, and the A/D 14 converts analog signal received from the analog local loop to digital signals. The A/D converter and the D/A converter can also be described as capable of implementing a CODEC (coder/decoder) function. The A/D can implement a mu-law CODEC. Those skilled in the art are familiar with the non-linear mu-law and A-law signal compression algorithms. The mu-law algorithm includes 255 discrete signal conversion values; A-law uses 256 values. The broad principles of the invention are not, however, limited to a specific quantization scheme. The A/D 14 can utilize 255 non-uniformly spaced quantization levels, which are closer together for small analog signal values and spread further apart for large signal values, to convert an analog signal received from the analog subscriber loop to one of 255 unique "symbols" or "levels".

The operation of the service provider 10 can be further explained with reference to the following mathematical analysis. In particular, if we assume that the subscriber 20 transmits a training signal, S(t), with all harmonic terms as follows:

$$S(t) = \sum_{i=1}^{\infty} \sin(i * \omega_0 t) \quad (1)$$

where $\omega_0$ is the base frequency.

Then the received signal, R(t), at the service provider 10 will be:

$$R(t) = \sum_{i=1}^{\infty} C_i \sin[i * \omega_0(t - t_0 - \Delta t)] + n(t) \quad (2)$$

where $\Delta t$ is a phase offset between the receiving service provider 10 and the transmitting subscriber 20 due to the sampling offset, and where $t_0$ is the time delay at the receiving service provider 10 and $C_i$ is constant coefficient.

The modulator 16 can then calculate the signals Rx and Ry. In particular, modulator 16 modulates R(t) by a cosine signal to generate Rx and modulator 16 modulates R(t) by a sine signal to generate Ry. That is:

$$Rx = \int_T R(t) * \cos(\omega_0 t) dt$$

$$= \sum_{i=1}^{\infty} \int_T C_i \sin[i * \omega_0(t - t_0 - \Delta t)] \cos(\omega_0 t) dt + N(t)$$

$$= C_1 \sin[\omega_0(t_0 + \Delta t)] + N$$

$$Ry = \int_T R(t) * \sin(\omega_0 t) dt$$

$$= \sum_{i=1}^{\infty} \int_T C_i \sin[i * \omega_0(t - t_0 - \Delta t)] \sin(\omega_0 t) dt + N(t)$$

$$= C_1 \cos[\omega_0(t_0 + \Delta t)] + N$$

where $$T = \frac{2\pi}{\omega_0}$$

The processor 18 can determine the phase offset by calculating the arctangent of (Rx/Ry). In particular, analysis of the above cited equations for Rx and Ry reveals that:

$$(t_0 + \Delta t) = \frac{1}{\omega_0} \arctan \frac{Rx}{Ry} + n$$

or $\Delta t = (1/\omega_0) * \text{arctangent}(Rx/Ry) + n - t_0$,

If this adjustment in sent from the service provider 10 back to the subscriber 20, then the subscriber 20 can send a new signal that is pre-adjusted to remove any phase offset at the service provider. In particular, the received signal at the service provider 10 after pre-adjusting in accordance with the invention is:

$$R(t) = \sum_{i=1}^{\infty} C_i \sin(i * \omega_0 t) + noise$$

Figure 2:
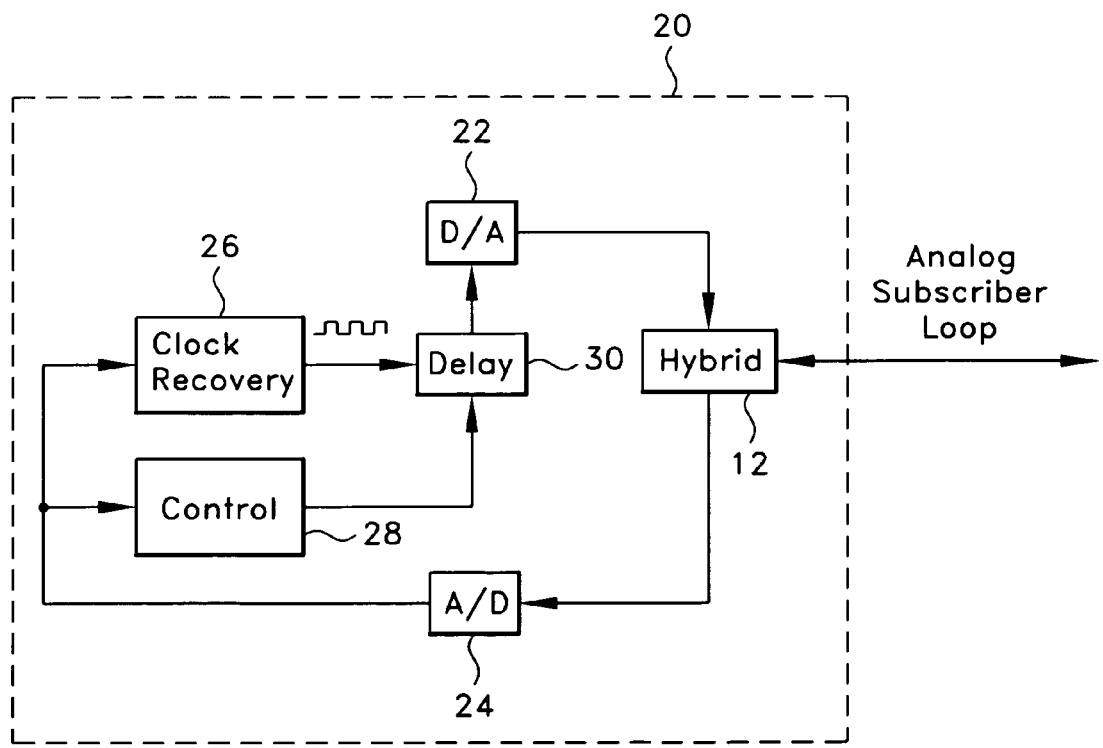
FIG. 2 is a block diagram of a subscriber, in accordance with the invention

FIG. 2 is a block diagram of a subscriber 20, in accordance with the invention. The subscriber 20 is operably coupled via an analog subscriber loop to a service provider 10 of FIG. 1. A phase offset can exist between the clock in the subscriber 20 and a network clock to which the service provider 10 is synchronized. The subscriber 20, according to the invention, removes this offset by adjusting its local clock signal.

The subscriber 20 includes a D/A converter 22, and A/D converter 24, a clock recovery circuit 26 and a control element 28. The subscriber can also include a hybrid 12 for coupling the A/D and the D/A converters to the analog subscriber loop. The D/A converter 22 converts a digital signal into an analog signal in preparation for transmission over the analog subscriber loop. The A/D converter 24 converts analog signals received from the analog subscriber loop into a received digital signal. The output of the A/D converter 24 is applied to the clock recovery circuit 26.

The clock recovery circuit 26 recovers a clock signal from the received digital signal. The recovered clock signal is applied to the delay element 30. The clock recovery circuit 26 and the delay element 30 are conventional elements, well known in the art.

The control element 28 generates a phase adjusted clock signal by adjusting the phase of the recovered clock signal by a phase offset. Particularly, the control element 28 directs the delay element 30 to adjust the phase of the recovered clock signal output by the clock recovery circuit 26. The control element determines the extent of the phase adjustment based upon control signals received from the service provider 10. The service provider 10, as discussed above, determines the extent of phase adjustment based upon a training signal sent by the subscriber 20. For example, the phase offset is based upon the arctangent of a training signal that is modulated by the service provider.

The subscriber 20 corrects for the phase offset between the subscriber 20 and the service provider 10 by synchronizing subsequent conversions by the D/A converter 22 with the phase adjusted clock signal. This synchronization to the phase adjusted clock signal causes signals transmitted by the subscriber 20 to be in phase with the network clock when received at the service provider 10.

Figure 3:
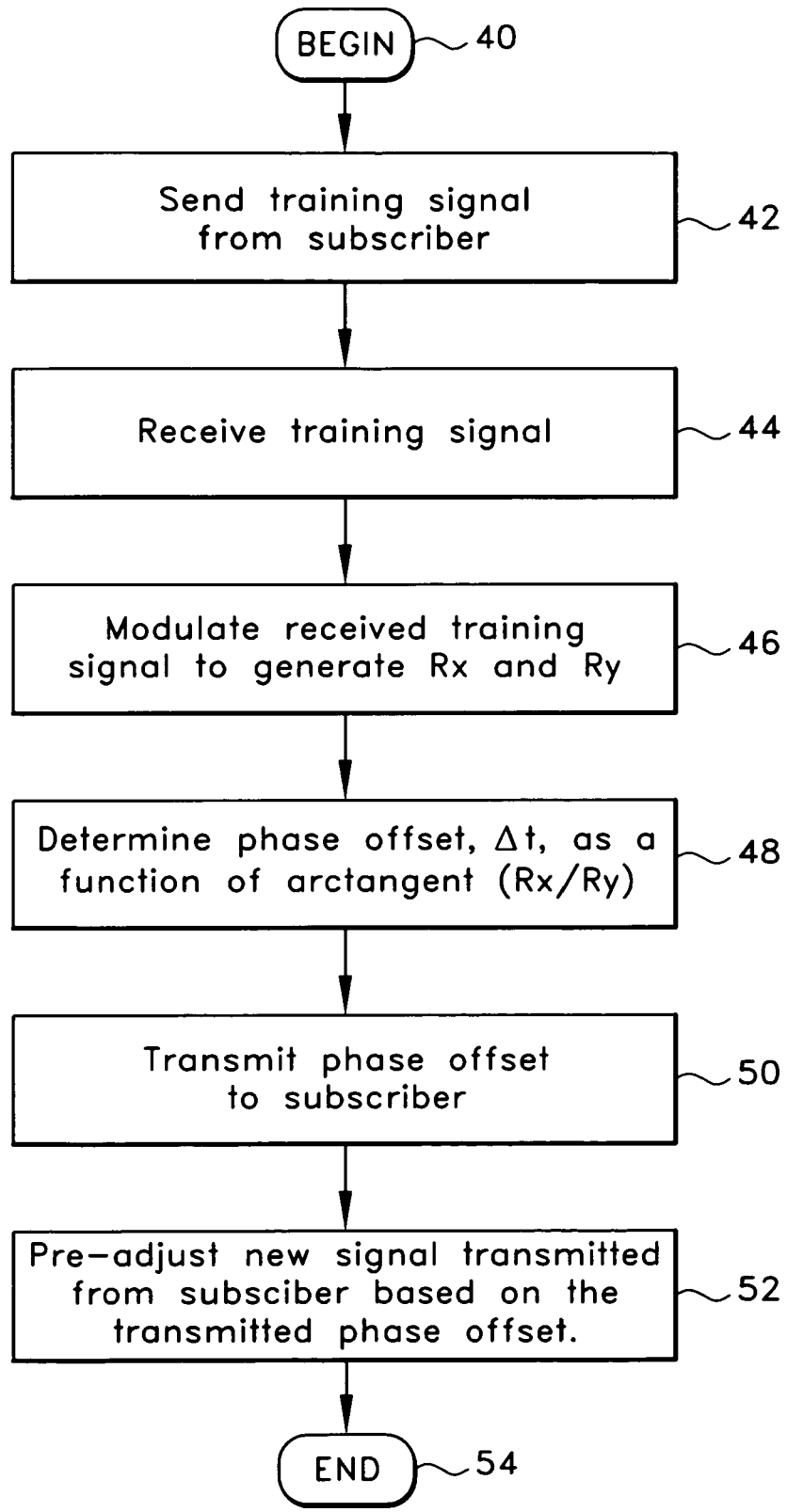
FIG. 3 is a flow chart illustrating a method of correcting for phase offset, in accordance with the invention.
Figure 4:
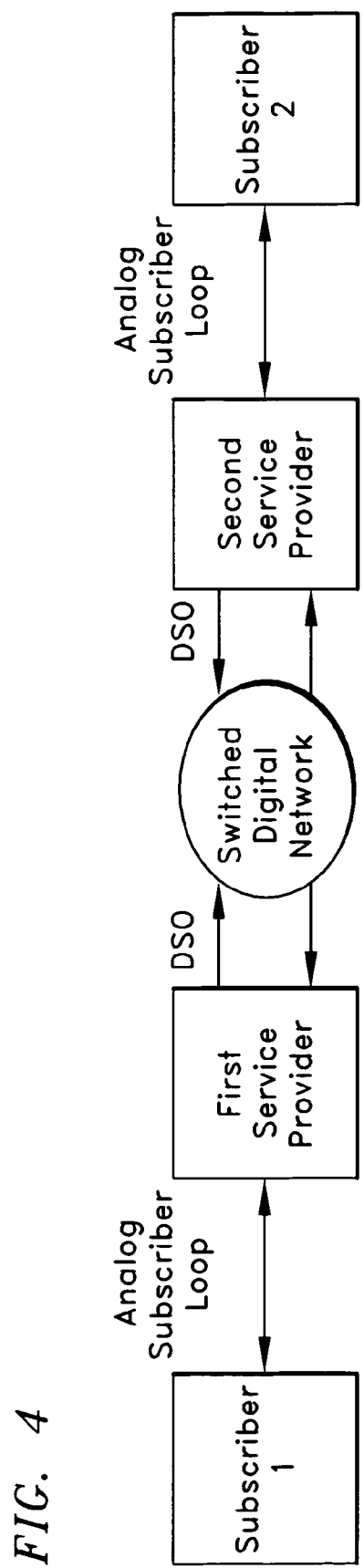
FIG. 4 shows a block diagram of a conventional Public Switch Telephone Network.

FIG. 3 is a flow chart illustrating a method of improving transmission in the upstream direction by correcting for a phase offset between a subscriber 20 and a service provider 10. One aspect of the invention provides for a method of sending a training signal from the subscriber (step 42), receiving a training signal (step 44), calculating the phase offset (step 48), transmitting the calculated phase offset (step 50), and pre-adjusting a new signal transmitted from the subscriber (step 52).

The method begins at step 40, and processing proceeds to step 42. At step 42, the subscriber 20 sends a training signal to the service provider 10. After step 42, the method proceeds to step 44.

At step 44, the service provider 10 receives the training signal from the subscriber 20.

At step 46, the service provider 10 modulates the received training signal by a cosine function to generate the signal Rx. The service provider 10 also modulates the received training signal by a sine function to generate the signal Ry. Processing next proceeds to step 48.

At step 48, the service provider 10 calculates the phase offset between the subscriber and the service provider based upon signals Rx and Ry generated at step 46. In particular, the processor 18 determines the phase offset based upon a computation of the arctangent of (Rx/Ry).

At step 50, the service provider 10 transmits the calculated phase offset to the subscriber 20.

At step 52, the subscriber 20 pre-adjusts a new signal transmitted from the subscriber to the service provider based upon the transmitted phase offset.

While the invention has been shown and described having reference to specific preferred embodiments, those skilled in the art will recognize that variation in form and detail may be made without departing from the spirit and scope of the invention. Thus, specific details of the disclosure herein are not intended to be necessary limitations on the scope of the invention other than as required by the prior art.

What is claimed is:

1. A method of correcting for a phase offset between a subscriber and a service provider, comprising:
sending a training signal from the subscriber to the service provider, the service provider being synchronized to a network clock,
receiving the training signal at the service provider,
calculating the phase offset between the subscriber and the service provider based upon the received training signal,
transmitting the calculated phase offset from the service provider to the subscriber, and
pre-adjusting a new signal transmitted from the subscriber to the service provider based upon the transmitted phase offset; wherein the calculating step further comprises modulating the received training signal by a cosine function to generate a signal Rx and modulating the received training signal by a sine function to generate a signal Ry wherein,
R(t)=the received training signal,
$\omega_0$=the base frequency of the training signal, and $$Rx = \int_T R(t) * \cos(\omega_0 t)\, dt,$$

wherein $T=2\Pi/\omega_0$.

2. The method of claim 1, wherein
R(t)=the received training signal,
$\omega_0$=the base frequency of the training signal, and $$Ry = \int_T R(t) * \sin(\omega_0 t)\, dt,$$

wherein $T=2\Pi/\omega_0$.

3. The method according to claim 1, further comprising the step of determining the phase offset, $\Delta t$, as a function of the arctangent (Rx/Ry).

4. The method of claim 3, wherein
the phase offset $\Delta t=(1/\ 7_0)$*arctangent (Rx/Ry)+n–$t_0$,
wherein $t_0$=the time delay at the service provider side.

5. The method according to claim 1, wherein the step of transmitting the calculated phase offset further includes transmitting a calculated time delay at the service provider side, $t_0$.

6. The method of claim 3, further including the step of pre-adjusting the new signal transmitted from the subscriber to the service provider based upon the transmitted phase offset and the transmitted time delay at the service provider side.

7. The method according to claim 1, further including the step of transmitting the pre-adjusted new signal such that the new signal is in phase with the network clock when the new signal is received at the service provider.

8. The method according to claim 1, wherein the pre-adjusting step further includes adjusting the phase of a clock signal in the subscriber by the transmitted phase offset.

9. A subscriber operably coupled via an analog subscriber loop to a service provider, the service provider being synchronized with a network clock, wherein the subscriber comprises:
- a digital to analog converter for converting a digital signal into an analog signal in preparation for transmission over the analog subscriber loop,
- an analog to digital converter for converting received analog signals, received from the analog subscriber loop, into a received digital signal,
- a clock recovery circuit for recovering a clock signal from the received digital signal, and
- a control element that generates a phase adjusted clock signal by adjusting the phase of the recovered clock signal by a phase offset, the phase offset being based upon the arctangent of a training signal modulated by the service provider,
- wherein a subsequent conversion by the digital to analog converter is synchronized to the phase adjusted clock signal such that signals transmitted by the subscriber are in phase with the network clock when received at the service provider; wherein the phase offset, Δt, is determined based upon the arctangent (Rx/Ry), wherein $$Rx = \int_T R(t) * \cos(\omega_0 t)\, dt,$$

and $$Ry = \int_T R(t) * \sin(\omega_0 t)\, dt,$$

wherein T=2 Π/ω$_0$
R(t)=a training signal sent from the subscriber to the service provider, and
ω$_0$=the base frequency of the training signal.

10. A service provider for determining a phase offset between the service provider and a subscriber operably coupled to the service provider, the service provider comprising:
- a cosine modulator for modulating a training signal received from the subscriber by a cosine function to generate a signal Rx,
- a sine modulator for modulating a training signal received from the subscriber by a sine function to generate a signal Ry, and
- a processor for determining the phase offset based upon the arctangent (Rx/Ry); wherein the phase offset, Δt, is determined based upon the arctangent (Rx/Ry), wherein $$Rx = \int_T R(t) * \cos(\omega_0 t)\, dt,$$

and $$Ry = \int_T R(t) * \sin(\omega_0 t)\, dt,$$

wherein T=2/ω$_0$
R(t)=a training signal sent from the subscriber to the service provider, and
ω$_0$=the base frequency of the training signal.

11. The service provider according to claim 8, wherein the phase offset, Δt, is determined by the processor in accordance with the following equation:

Δt=(1/ω$_0$)*arctangent (Rx/Ry)+n−t$_0$, wherein t$_0$=the time delay at the service provider side, and n=a constant.

* * * * *